(12) United States Patent
Itou et al.

(10) Patent No.: US 11,476,489 B2
(45) Date of Patent: Oct. 18, 2022

(54) FUEL CELL UNIT

(71) Applicant: TOYOTA JIDOSHA KABUSHIKI KAISHA, Toyota (JP)

(72) Inventors: Masayuki Itou, Sunto-gun (JP); Keita Kinoshita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 379 days.

(21) Appl. No.: 16/903,795

(22) Filed: Jun. 17, 2020

(65) Prior Publication Data

US 2021/0043961 A1 Feb. 11, 2021

(30) Foreign Application Priority Data

Aug. 6, 2019 (JP) .............................. JP2019-144707

(51) Int. Cl.
*H01M 8/2475* (2016.01)
*H01M 8/249* (2016.01)
*H01M 8/04082* (2016.01)

(52) U.S. Cl.
CPC ..... *H01M 8/2475* (2013.01); *H01M 8/04201* (2013.01); *H01M 8/249* (2013.01)

(58) Field of Classification Search
CPC ........... H01M 8/2475; H01M 8/04201; H01M 8/249; H01M 8/04067; H01M 2250/20; Y02E 60/50; H02M 1/00
See application file for complete search history.

(56) References Cited

U.S. PATENT DOCUMENTS

| | | | |
|---|---|---|---|
| 2007/0254193 A1* | 11/2007 | Lam | H01M 8/04597 429/431 |
| 2012/0028135 A1* | 2/2012 | Ohashi | B60L 50/72 429/400 |
| 2012/0295173 A1* | 11/2012 | Yamamoto | H01M 8/0612 429/423 |
| 2017/0077467 A1* | 3/2017 | Kronke | H01M 50/271 |
| 2018/0272889 A1 | 9/2018 | Nakamura | |
| 2018/0277870 A1* | 9/2018 | Tokunaga | H01M 8/04029 |
| 2022/0173425 A1* | 6/2022 | Ito | H01M 8/2475 |

FOREIGN PATENT DOCUMENTS

| | | |
|---|---|---|
| JP | 2017-073199 | 4/2017 |
| JP | 2018-163846 | 10/2018 |

* cited by examiner

*Primary Examiner* — Muhammad S Siddiquee
(74) *Attorney, Agent, or Firm* — Finnegan, Henderson, Farabow, Garrett & Dunner, LLP

(57) ABSTRACT

A fuel cell unit includes: a first case housing a fuel cell stack; a second case housing a power converter; an adapter fixing the first and second cases together; and a conductive member connecting between the fuel cell stack and the power converter. A first flange portion, surrounding a first opening portion, of the first case and a second flange portion, surrounding a second opening portion, of the second case are different in at least one of shape and size. The adapter includes: a third flange portion corresponding to the first flange portion; a fourth flange portion corresponding to the second flange portion; a surrounding wall portion continuous from the third flange portion to the fourth flange portion to define an internal space communicating with openings inside the third and fourth flange portions; and a partition wall portion between the first opening portion and the second opening portion.

13 Claims, 10 Drawing Sheets

FUEL CELL UNIT

INCORPORATION BY REFERENCE

The disclosure of Japanese Patent Application No. 2019-144707 filed on Aug. 6, 2019 including the specification, drawings and abstract is incorporated herein by reference in its entirety.

BACKGROUND

1. Technical Field

The present disclosure relates to a fuel cell unit.

2. Description of Related Art

To unitize a fuel cell stack and a power converter that converts power of the fuel cell stack, a case that houses the power converter is occasionally fixed to a case that houses the fuel cell stack while electrically connecting between the fuel cell stack and the power converter (see Japanese Patent Application Publication No. 2017-073199 (JP 2017-073199 A), for example).

SUMMARY

The case which houses the fuel cell stack and the case which houses the power converter are occasionally different in size, and it may be difficult to fix the two cases to each other.

In addition, it is necessary to provide the two cases with opening portions that allow passage of a conductive member that electrically connects between the fuel cell stack and the power converter. When the two cases are fixed to each other, heat of the fuel cell stack may be conducted to the power converter via the opening portions, which may affect electronic parts of the power converter. In addition, heat of the power converter may be conducted to the fuel cell stack, which may dry the inside of the fuel cell stack and affect power generation performance.

The present disclosure provides a fuel cell unit in which a case that houses a fuel cell stack and a case that houses a power converter are easily fixed to each other and in which heat conduction between the fuel cell stack and the power converter is suppressed.

An aspect of the present disclosure relates to a fuel cell unit including: at least one fuel cell stack; at least one first case that houses the at least one fuel cell stack; a power converter that converts power of the fuel cell stack; a second case that houses the power converter; an adapter that fixes the first and second cases to each other; and a conductive member that electrically connects between the fuel cell stack and the power converter, in which: the first case includes a first opening portion and a first flange portion that surrounds the first opening portion; the second case includes a second opening portion and a second flange portion that surrounds the second opening portion and that is different in at least one of shape and size from the first flange portion; the conductive member includes a connection conductive member that is connected to the fuel cell stack, that extends from the first opening portion to the second opening portion via an internal space of the adapter, and that is connected to the power converter; and the adapter includes a third flange portion fixed in correspondence with a shape and a size of the first flange portion, a fourth flange portion fixed in correspondence with a shape and a size of the second flange portion, a surrounding wall portion that is continuous from the third flange portion to the fourth flange portion so as to define the internal space which communicates with an opening defined inside the third flange portion and an opening defined inside the fourth flange portion, and a partition wall portion which is connected to an inner side surface of the adapter, is apart from the connection conductive member, and is positioned between the first opening portion and the second opening portion. In the present specification, the meaning of "at least one of A and B" includes "A", "B", and "A and B".

The partition wall portion may be closer to the first opening portion than to the second opening portion.

The partition wall portion may include a partition wall projecting portion that projects from an adapter side toward a first opening portion side so as to be surrounded by the first flange portion.

The power converter may include a plurality of electronic parts; and the partition wall portion may face at least a part of at least one of the electronic parts via the internal space.

The partition wall portion may include a partition wall side portion that faces at least the part of the at least one of the electronic parts in a direction that is orthogonal to a direction in which the first and second cases are arranged side by side via the adapter.

The first case may have a facing wall portion that is provided with the first opening portion and that faces the partition wall portion; and the first opening portion may be smaller in area than the opening defined inside the third flange portion.

The adapter may be smaller in size, in a direction in which the first and second cases are arranged side by side via the adapter, than each of the first and second cases.

At least a part of the fourth flange portion may project, in an intersecting direction which intersects a direction in which the first and second cases are arranged side by side via the adapter, with respect to the third flange portion; and the surrounding wall portion may have a surrounding extended portion that extends in the intersecting direction from the third flange portion.

The fuel cell stack may have an end plate fixed to the first case and provided with a supply hole that allows a reaction gas to be supplied to the fuel cell stack and a discharge hole that allows the reaction gas to be discharged from the fuel cell stack; and the surrounding extended portion may face the end plate in the direction in which the first and second cases are arranged side by side via the adapter.

An auxiliary machine that supplies the reaction gas to the fuel cell stack may be fixed to the end plate; and the surrounding extended portion may face the auxiliary machine in the direction in which the first and second cases are arranged side by side via the adapter.

The at least one fuel cell stack may include a plurality of fuel cell stacks; the at least one first case may respectively house the at least one fuel cell stack; and the adapter may include the third flange portion which is respectively fixed to the first flange portion of the at least one first case.

The at least one fuel cell stack may include a plurality of fuel cell stacks; the at least one first case may respectively house the at least one fuel cell stack; the adapter may include a plurality of third flange portions which are respectively fixed to the first flange portion of the at least one first case; and the surrounding extended portion may be positioned between two adjacent third flange portions.

The conductive member may include a relay conductive member that connects two adjacent fuel cell stacks in series with each other; and the relay conductive member may extend from one of respective first opening portions of two adjacent first cases to another of the respective first opening portions of the two adjacent first cases across the surrounding extended portion.

According to the present disclosure, it is possible to provide a fuel cell unit in which a case that houses a fuel cell stack and a case that houses a power converter are easily fixed to each other and in which heat conduction between the fuel cell stack and the power converter is suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Schematic Configuration of Fuel Cell Unit 1

Figure 1:
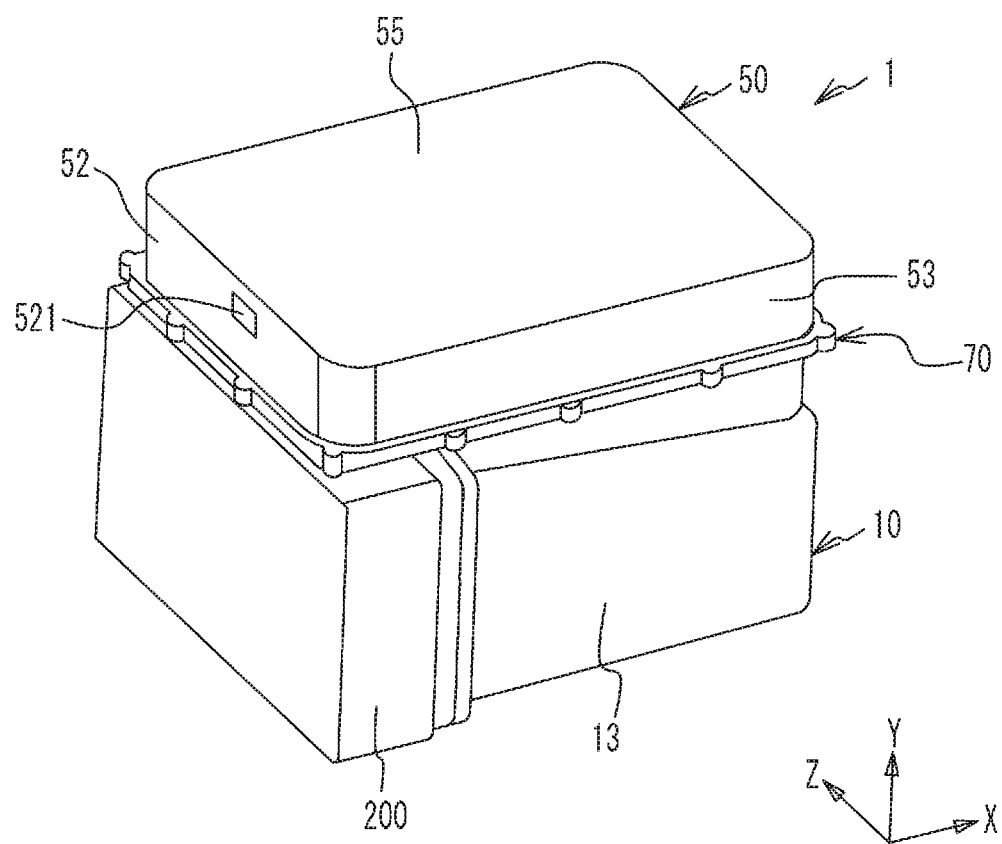
FIG. 1 is a perspective view illustrating the appearance of a fuel cell unit.

FIG. 1 is a perspective view illustrating the appearance of a fuel cell unit 1.

Figure 2:
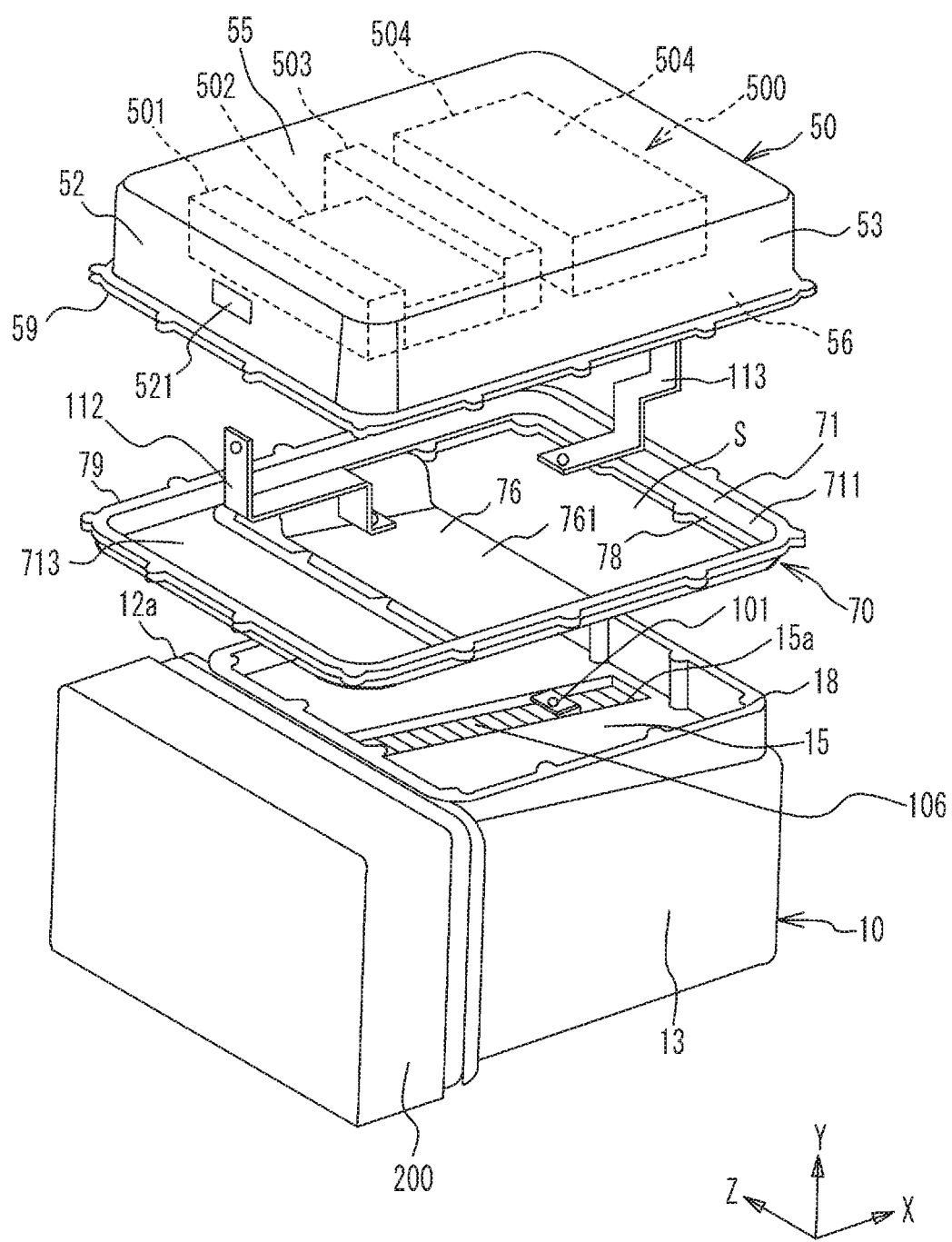
FIG. 2 is an exploded perspective view of the fuel cell unit.
Figure 3:
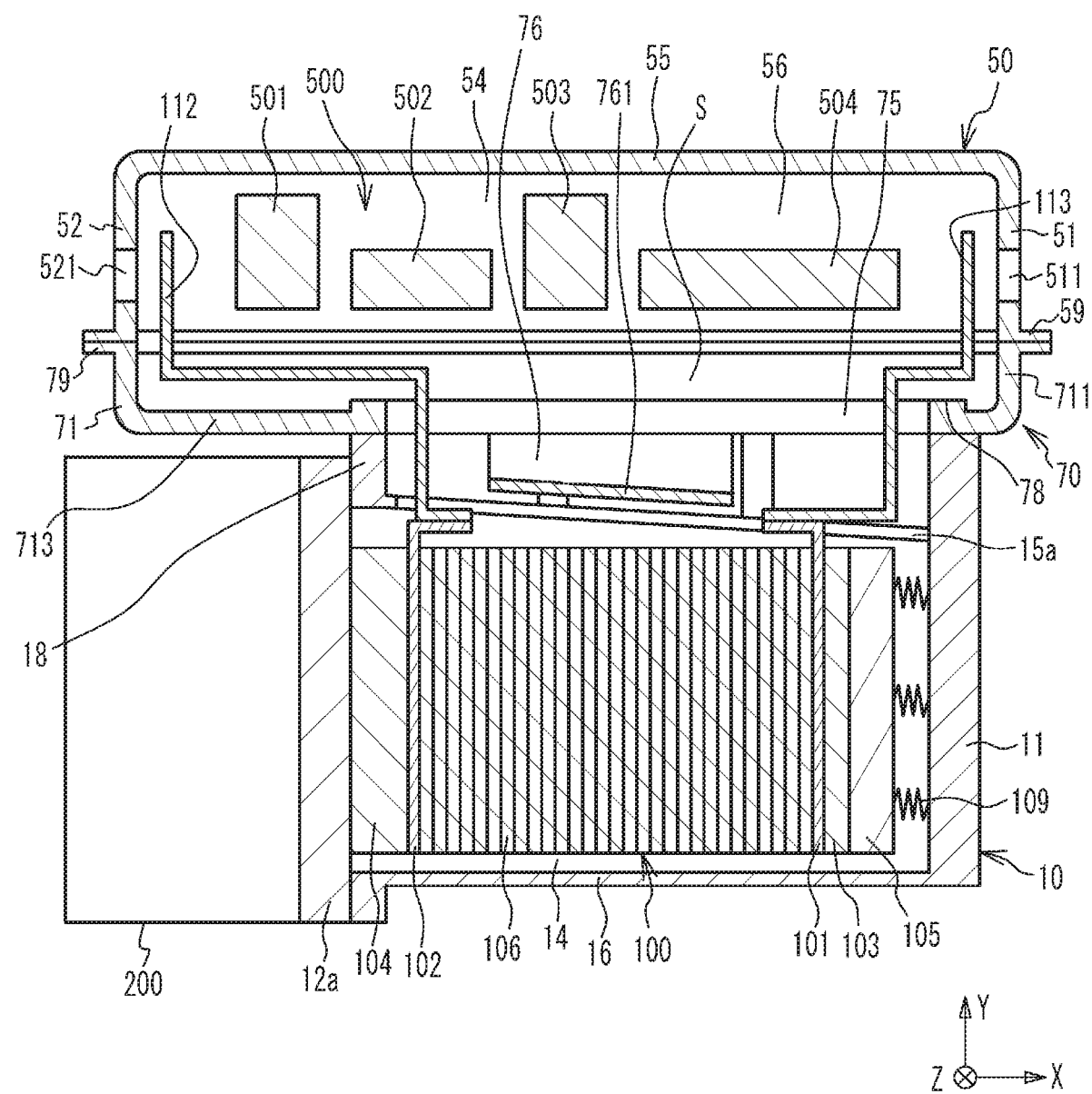
FIG. 3 is a sectional view of the fuel cell unit.

FIG. 2 is an exploded perspective view of the fuel cell unit 1. FIG. 3 is a sectional view of the fuel cell unit 1. The fuel cell unit 1 includes a stack case 10, a fuel cell stack 100 housed in the stack case 10, a converter case 50, a step-up converter 500 housed in the converter case 50, an auxiliary machine unit 200 fixed to the outside of the stack case 10, and an adapter 70 to be discussed in detail later. In the drawings, the X direction, the Y direction, and the Z direction are orthogonal to each other. The Y direction is an example of the direction in which the stack case 10 and the converter case 50 are arranged side by side via the adapter 70. The X direction is an example of the direction in which a plurality of unit cells 106 of the fuel cell stack 100 to be discussed later are stacked. The stack case 10 and the auxiliary machine unit 200 are arranged side by side in the X direction. A part of the converter case 50, a part of the adapter 70, and the auxiliary machine unit 200 overlap each other in the Y direction. FIG. 3 illustrates a sectional surface of the fuel cell unit 1 that is parallel to the XY plane. The internal structure of the auxiliary machine unit 200 is not illustrated in the drawing.

The fuel cell stack 100 generates power when an oxidant gas and a fuel gas are supplied, and generates heat along with the power generation. The step-up converter 500 is electrically connected to the fuel cell stack 100 through a conductive member to be discussed later. The step-up converter 500 boosts the output voltage of the fuel cell stack 100, and outputs the boosted voltage to external devices. In this event, the step-up converter 500 generates heat. The step-up converter 500 is an example of a power converter that generates heat by converting the output power of the fuel cell stack 100. The power converter is not limited to a step-up converter, and may be any of a step-down converter, a step-up/step-down converter that can step up and down a voltage, and an inverter that converts DC power into AC power. The stack case 10, the converter case 50, the adapter 70, and a case for the auxiliary machine unit 200 are formed from a highly rigid material such as a metal material such as an aluminum alloy, for example. The stack case 10 is an example of a first case. The converter case 50 is an example of a second case.

Schematic Configuration of Stack Case 10

The stack case 10 includes side wall portions 11, 13, and 14, an upper wall portion 15, and a bottom wall portion 16. The side wall portion 11 is parallel to the YZ plane. The side wall portions 13 and 14 are away from each other in the Z direction, and parallel to the XY plane. The upper wall portion 15 and the bottom wall portion 16 are away from each other in the Y direction. The bottom wall portion 16 is parallel to the XZ plane. The upper wall portion 15 is inclined with respect to the XZ plane as discussed in detail later. The stack case 10 is not provided with a wall portion, but is provided with an opening, at a position facing the side wall portion 11 in the −X direction. An end plate 12a to be discussed later is fixed to the stack case 10 so as to block the opening. The end plate 12a is parallel to the YZ plane as with the side wall portion 11. The upper wall portion 15 is actually inclined with respect to the XZ plane such that the height, in the Y direction, of an end portion of the upper wall portion 15 on the end plate 12a side is higher than the height, in the Y direction, of an end portion of the upper wall portion 15 on the side wall portion 11 side. However, the present disclosure is not limited thereto.

The upper wall portion 15 is provided with an opening portion 15a that extends over the entire upper wall portion 15 with the X direction corresponding to the longitudinal direction thereof. In FIG. 2, a terminal plate 101 that constitutes a part of the fuel cell stack 100 and a plurality of unit cells 106 are exposed from the opening portion 15a. The upper wall portion 15 faces a partition wall portion 76 to be discussed later. The upper wall portion 15 is an example of a facing wall portion. As illustrated in FIG. 3, the fuel cell stack 100 is housed in the stack case 10. An insulating sheet etc. may be provided between the unit cells 106 and the opening portion 15a so that the unit cells 106 are not exposed from the opening portion 15a.

The outer peripheral edge of the upper wall portion 15 of the stack case 10 is provided with a flange portion 18 in a generally rectangular frame shape surrounding the opening portion 15a to have a predetermined height in the +Y direction. The flange portion 18 is an inward flange provided with a plurality of projecting portions that project inward from the inner side surface thereof. The upper end surface of the flange portion 18 is parallel to the XZ plane. The flange portion 18 is an example of a first flange portion.

Schematic Configuration of Fuel Cell Stack 100

The fuel cell stack 100 includes: the plurality of unit cells 106 which are stacked in the X direction; the terminal plate 101, an insulator 103, and a pressure plate 105 disposed on one end side of the plurality of unit cells 106 and stacked in this order from the side of the plurality of unit cells 106; and a terminal plate 102, an insulator 104, and the end plate 12a disposed at the other end of the plurality of unit cells 106 and stacked in this order from the side of the plurality of unit cells 106. The pressure plate 105 is biased toward the end plate 12a by springs 109 disposed between the side wall portion 11 and the pressure plate 105. Consequently, the plurality of unit cells 106, the terminal plates 101 and 102, and the insulators 103 and 104 are stacked as compressed between the end plate 12a which is fixed to the stack case 10 and the pressure plate 105.

The unit cells 106 are each a solid polymer fuel cell supplied with air containing oxygen as an oxidant gas and a hydrogen gas as a fuel gas to generate power. The unit cells 106 each include a membrane electrode assembly which is a power generation body in which an electrode is disposed on both surfaces of an electrolyte membrane and a pair of separators that hold the membrane electrode assembly therebetween. The electrolyte membrane is a solid polymer membrane formed from a fluorine resin material having a sulfonic acid group or a hydrocarbon resin material, and has a good proton conductivity in a wet state. The electrode is configured to include a carbon carrier and an ionomer which is a solid polymer having a sulfonic acid group and which has a good proton conductivity in a wet state. The carbon carrier carries a catalyst (such as platinum or a platinum-cobalt alloy, for example) that promotes a power generation reaction. The separators are formed from a material that has gas barrier properties and that is conductive, and may be formed as a thin plate member formed from metal such as stainless steel, titanium, or a titanium alloy by pressing or as a member made of carbon such as high-density carbon.

The terminal plates 101 and 102 are each a plate formed from metal such as copper, aluminum, or an alloy containing such metal or a conductive material such as high-density carbon, for example. The insulators 103 and 104 are each a plate formed from an insulating material such as rubber or a resin, for example. The end plate 12a and the pressure plate 105 are formed from a highly rigid material such as a metal material such as stainless steel or an aluminum alloy, for example. The end plate 12a is provided with supply holes that allow an oxidant gas, a fuel gas, and cooling water to be supplied to the fuel cell stack 100 respectively and discharge holes that allow an oxidant gas, a fuel gas, and cooling water to be discharged from the fuel cell stack 100 respectively, although such holes are covered by the auxiliary machine unit 200 and not seeable.

As illustrated in FIG. 3, each of the terminal plates 101 and 102 is provided with a projecting portion that projects in the +Y direction from the plurality of unit cells and that is exposed from the opening portion 15a. As illustrated in FIG. 3, in addition, the plurality of unit cells 106 of the fuel cell stack 100 are electrically connected to the step-up converter 500 through connection bus bars 112 and 113. The connection bus bars 112 and 113 are formed from metal with a low electrical resistivity such as copper, aluminum, or an alloy containing such metal, for example. The connection bus bars 112 and 113 are examples of a connection conductive member included in a conductive member.

One end of the connection bus bar 112 is connected to the projecting portion of the terminal plate 102 via the opening portion 15a. The connection bus bar 112 extends in the +Y direction from the opening portion 15a, extends in the −X direction along a surrounding bottom portion 713 to be discussed later, and extends in the +Y direction through an internal space S of the adapter 70 to be discussed later. The other end of the connection bus bar 112 is connected to the step-up converter 500. One end of the connection bus bar 113 is connected to the projecting portion of the terminal plate 101 via the opening portion 15a. The connection bus bar 113 extends in the +Y direction from the opening portion 15a, extends in the +X direction in the internal space S of the adapter 70, and then extends in the +Y direction. The other end of the connection bus bar 113 is connected to the step-up converter 500. The respective other ends of the connection bus bars 112 and 113 and the step-up converter 500 are connected to each other by a conductive member (not illustrated) such as a bus bar or a cable.

Schematic Configuration of Auxiliary Machine Unit 200

The auxiliary machine unit 200 is fixed to the end plate 12a. The auxiliary machine unit 200 includes at least two of: an air compressor that supplies an oxidant gas to the fuel cell stack 100; an injector that supplies a fuel gas to the fuel cell stack 100; a circulation pump that supplies a fuel off gas to the fuel cell stack 100; an electric pump that supplies cooling water to the fuel cell stack 100; a humidifier module that humidifies at least one of the fuel gas and the oxidant gas to be supplied to the fuel cell stack 100; and various valves that switch between a state in which a flow of at least one of the fuel gas, the oxidant gas, and the cooling water is allowed and a state in which such a flow is blocked, for example. For example, the air compressor pumps air to the fuel cell stack 100 from a supply hole for the oxidant gas in the end plate 12a. The injector injects the fuel gas to the fuel cell stack 100 via a supply hole for the fuel gas in the end plate 12a. The circulation pump suctions the fuel off gas from a discharge hole for the fuel gas in the end plate 12a to supply the fuel off gas to the fuel cell stack 100 from a supply hole for the fuel gas in the end plate 12a. The electric pump pumps the cooling water from a supply hole for the cooling water in the end plate 12a. The auxiliary machine unit 200 is illustrated in a simplified manner Such auxiliary machines can be driven by power generated by the fuel cell stack 100.

Schematic Configuration of Converter Case 50

The converter case 50 includes side wall portions 51 to 54 and an upper wall portion 55. The side wall portions 51 and 52 are away from each other in the X direction, and parallel to the YZ plane. However, the side wall portions 51 and 52 may not necessarily be parallel, and may be slightly inclined. The side wall portions 53 and 54 are away from each other in the Z direction, and parallel to the YX plane. However, the side wall portions 53 and 54 may be slightly inclined. The upper wall portion 55 is parallel to the XZ plane. The length of each of the side wall portions 53 and 54 in the X direction is longer than the length of each of the side wall portions 51 and 52 in the Z direction. The side wall portions 51 and 52 are provided with service holes 511 and 521, respectively, to be discussed later. The length of each of the side wall portions 53 and 54 in the X direction is longer than the length of each of the side wall portions 13 and 14 of the stack case 10 in the X direction.

The converter case 50 is not provided with a wall portion that is parallel to the upper wall portion 55 and that faces the upper wall portion 55, but is provided with an opening portion 56. In other words, the converter case 50 is in a bucket shape with the upper wall portion 55 serving as the bottom. The opening portion 56 faces the stack case 10 via the adapter 70.

A flange portion 59 is formed at the peripheral edge of the opening portion 56 of the converter case 50. In other words, the flange portion 59 is provided so as to surround the opening portion 56. The flange portion 59 is an outward flange provided with a plurality of projecting portions that project outward from the outer side surface thereof. The lower end surface of the flange portion 59 is parallel to the XZ plane. The flange portion 59 is different in shape and size from the flange portion 18 of the stack case 10 discussed above. Specifically, the flange portion 59 projects in the –X direction in the XZ plane with respect to the flange portion 18 of the stack case 10. As described above, the stack case 10 and the converter case 50 are different in shape in the XZ plane from each other, and the flange portion 18 of the stack case 10 and the flange portion 59 of the converter case 50 cannot be directly fixed to each other. The flange portion 59 is an example of a second flange portion.

Schematic Configuration of Step-Up Converter 500

The step-up converter 500 includes a capacitor 501, an intelligent power module (IPM) 502, a current sensor 503, and a reactor 504. These are examples of a plurality of electronic parts. The electronic parts are held by bases (not illustrated) fixed to the inner surface of the upper wall portion 55 of the converter case 50 to be exposed from the opening portion 56. The electronic parts are electrically connected to each other via a conductive member (not illustrated) such as a bus bar or a cable. Meanwhile, the other end of the connection bus bar 112 is electrically connected to the capacitor 501 via a conductive member (not illustrated). The service hole 521 which is formed in the side wall portion 52 is used to fasten the other end of the connection bus bar 112 and a conductive member (not illustrated) to each other from the outside. The other end of the connection bus bar 113 is electrically connected to the reactor 504 via a conductive member (not illustrated). The service hole 511 which is formed in the side wall portion 51 is used to fasten the other end of the connection bus bar 113 and a conductive member (not illustrated) to each other from the outside. The service holes 511 and 521 are closed by a lid etc. after the connection bus bars 112 and 113 are fastened to the respective conductive members discussed above.

Detailed Configuration of Adapter 70

The adapter 70 includes a surrounding wall portion 71, a partition wall portion 76, and flange portions 78 and 79. The surrounding wall portion 71 is in a generally rectangular frame shape having a predetermined height in the Y direction. The height of the adapter 70 in the Y direction is smaller than the height of the stack case 10 in the Y direction, and also smaller than the height of the converter case 50 in the Y direction. The surrounding wall portion 71 is continuous from the flange portion 78 to the flange portion 79. In other words, the flange portion 78 is formed at an end portion of the surrounding wall portion 71 on the side in the –Y direction, and the flange portion 79 is formed at an end portion of the surrounding wall portion 71 on the side in the +Y direction. The surrounding wall portion 71 includes a surrounding peripheral portion 711 that extends around the Y direction in a generally rectangular frame shape, and the surrounding bottom portion 713 which is continuous with the surrounding peripheral portion 711 and which extends in parallel with the XZ plane. The flange portion 79 is formed at an end portion of the surrounding peripheral portion 711 on the converter case 50 side. The surrounding bottom portion 713 extends in the –X direction from the flange portion 78. The surrounding bottom portion 713 is an example of a surrounding extended portion. The surrounding wall portion 71 defines the internal space S which communicates with an opening defined inside the flange portion 78 and an opening defined inside the flange portion 79. The connection bus bars 112 and 113 are connected to the fuel cell stack 100 and the step-up converter 500 via the internal space S.

The flange portion 78 is an inward flange as with the flange portion 18 of the stack case 10. The flange portion 79 is an outward flange as with the flange portion 59 of the converter case 50. The partition wall portion 76 is continuous with sides on the inner side of the flange portion 78 that extend in parallel with the X direction and that face each other. The partition wall portion 76 will be discussed in detail later. The lower end surface of the flange portion 78 and the upper end surface of the flange portion 79 are parallel to the XZ plane. The flange portion 79 is positioned on the outer side with respect to the flange portion 78 in the XZ plane, and more particularly projects toward the side in the –X direction with respect to the flange portion 78.

The flange portion 78 corresponds in shape and size to the flange portion 18 of the stack case 10 to be fixed thereto. That is, the flange portion 78 is the same in shape and size as the flange portion 18. Specifically, the flange portion 78 is provided with bolt holes respectively provided in a plurality of projecting portions provided at generally equidistant intervals in the circumferential direction to project inward from the inner side surface of the flange portion 78, and the flange portion 18 is provided with a plurality of female screw holes provided at generally equidistant intervals in the circumferential direction so as to correspond in position to the plurality of bolt holes of the flange portion 78. The flange portion 78 and the flange portion 18 are fixed to each other with the lower end surface of the flange portion 78 and the upper end surface of the flange portion 18 abutting against each other by fastening the two flange portions using bolts via the bolt holes and the female screw holes. Consequently, the stack case 10 and the adapter 70 are fixed to each other. Similarly, the flange portion 79 corresponds in shape and size to the flange portion 59 of the converter case 50, and the flange portion 79 and the flange portion 59 are fixed to each other by fastening the two flange portions using bolts. In this manner, the converter case 50 and the adapter 70 are fixed to each other, and the fuel cell stack 100 and the step-up converter 500 are integrated with each other. Since the surrounding wall portion 71 is continuous from the flange portion 78 to the flange portion 79, in addition, the surrounding wall portion 71 constitutes an outer wall portion of a case of the entire fuel cell unit 1 together with the stack case 10 and the converter case 50, and such cases are integrated with each other to tightly close the inside of the fuel cell unit 1. The flange portion 78 is an example of a third flange portion. The flange portion 79 is an example of a fourth flange portion.

A rubber gasket or a liquid gasket for improving seal performance is preferably interposed between the lower end surface of the flange portion 78 and the upper end surface of the flange portion 18 and between the upper end surface of the flange portion 79 and the lower end surface of the flange portion 59. Specifically, a rubber gasket or a liquid gasket is preferably interposed on the outer side of the bolt holes and the female screw holes between the lower end surface of the flange portion 78 and the upper end surface of the flange portion 18, and a rubber gasket or a liquid gasket is preferably interposed on the inner side of the bolt holes and the female screw holes between the upper end surface of the flange portion 79 and the lower end surface of the flange portion 59. Consequently, communication between the inside and the outside of the integral case via the bolt holes and the female screw can be prevented to enhance the seal performance of the integral case. Since the flange portions 78 and 18 are inward flanges and the flange portions 79 and 59 are outward flanges, more linear seal lines can be formed, and therefore the seal performance can be further enhanced.

In this manner, the stack case 10 and the converter case 50 can be easily fixed to each other via the adapter 70 even in the case where the stack case 10 and the converter case 50 are different in shape from each other and the flange portion 18 and the flange portion 59 are also different in shape from each other. For example, it is conceivable to change the shape of at least one of the stack case 10 and the converter case 50 such that the flange portion 18 of the stack case 10 and the flange portion 59 of the converter case 50 can be directly fixed to each other. However, if the stack case 10 is enlarged in the X direction such that the flange portion 18 corresponds to the flange portion 59, for example, the stack case 10 is increased in size, which increases the manufacturing cost and the weight thereof. If the converter case 50 is reduced in size in the X direction such that the flange portion 59 corresponds to the flange portion 18, on the other hand, the internal capacity of the converter case 50 is reduced and the step-up converter 500 discussed above may not be housed therein. In this case, if the converter case 50 is increased in size in the Y direction while reducing the converter case 50 in size in the X direction in order to secure the internal capacity thereof, the entire fuel cell unit 1 is increased in size in the Y direction, which may degrade the mountability of the fuel cell unit 1 onto a vehicle etc., for example. In addition, besides the above, the stack case 10 and the converter case 50 are often optimized in shape in order to meet various requirements, and the changes described above may not be easily implemented. In the present embodiment, the adapter 70 is interposed between the stack case 10 and the converter case 50, which allows the fuel cell stack 100 and the step-up converter 500 to be easily integrated with each other without changing the shape and the size of the stack case 10 and the converter case 50.

In addition, when another converter case that is different in shape from the converter case 50 is to be fixed to the stack case 10, for example, another adapter that has a flange portion corresponding to the shape of the flange portion of the converter case may be prepared, rather than changing the shape of the converter case or the stack case 10. In this case, such an adapter can be manufactured at a low cost compared to a case where the shape of the converter case or the stack case 10 is to be changed, since the adapter is smaller in size than the converter case or the stack case 10. The same also applies to an event in which another stack case that is different in shape from the stack case 10 is to be fixed to the converter case 50. In this manner, a wide variety of stack cases and converter cases shaped so as to meet various requirements can be integrated with each other at a low cost by using an adapter adapted thereto.

In addition, as discussed above, the surrounding bottom portion 713 of the adapter 70 extends in the −X direction from the flange portion 78, to which the stack case 10 is to be fixed, to be continuous to the flange portion 79, to which the converter case 50 is to be fixed, via the surrounding peripheral portion 711. Therefore, the converter case 50, which is increased in size in the X direction and accordingly reduced in size in the Y direction with respect to the stack case 10, can be fixed to the stack case 10 via the adapter 70. Since the converter case 50 which is increased in size in the X direction but is reduced in size in the Y direction can be fixed to the stack case 10 in this manner, the entire fuel cell unit 1 is reduced in size in the Y direction. The −X direction in which the surrounding bottom portion 713 extends from the flange portion 78 is an example of an intersecting direction which intersects the direction in which the stack case 10 and the converter case 50 are arranged side by side via the adapter 70.

In addition, the surrounding bottom portion 713 of the adapter 70 and a part of the converter case 50 overlap the end plate 12a and the auxiliary machine unit 200 in the Y direction. For example, in the case where the converter case 50 is fixed to the stack case 10 via the adapter 70 with the surrounding bottom portion 713 of the adapter 70 projecting in the +Z direction from the flange portion 78 and with the flange portion 59 of the converter case 50 also projecting in the +Z direction from the flange portion 18 of the stack case 10, the entire fuel cell unit 1 is increased in size in the direction of the XZ plane. In the present embodiment, the fuel cell unit 1 is reduced in size in the direction of the XZ plane with the respective areas of the end plate 12a and the auxiliary machine unit 200, the adapter 70, and the converter case 50 overlapping each other in the Z direction.

The total size of the stack case 10 and the auxiliary machine unit 200 in the X direction, the size of the converter case 50 in the X direction, and the size of the adapter 70 in the X direction are generally equal to each other. In addition, the respective sizes of the stack case 10, the converter case 50, the adapter 70, and the auxiliary machine unit 200 in the Z direction are also generally equal to each other. Therefore, as illustrated in FIG. 1, the entire fuel cell unit 1 has a generally rectangular parallelepiped outer shape, and therefore the mountability of the fuel cell unit 1 onto a vehicle etc. is improved.

Detailed Configuration of Partition Wall Portion 76

As illustrated in FIGS. 2 and 3, the partition wall portion 76 is in a generally thin plate shape with the Z direction corresponding to the longitudinal direction thereof, with the X direction corresponding to the short-length direction thereof, and with the Y direction corresponding to the thickness direction thereof. One end and the other end of the partition wall portion 76 are respectively connected to two sides at the inner peripheral edge of the flange portion 78 that are parallel to the X direction and that are away from each other in the Z direction. Therefore, the partition wall portion 76 is provided at a position closer to the opening portion 15a of the stack case 10 than to the opening portion 56 of the converter case 50. In addition, as illustrated in FIG. 3, the partition wall portion 76 is provided at a position that is apart from the connection bus bars 112 and 113 which pass from the opening portion 15a to the opening portion 56 via the internal space S, and specifically is positioned between the connection bus bar 112 and the connection bus bar 113.

The partition wall portion 76 is bent at one end thereof positioned in the +Z direction so as to extend in the −Y direction, that is, closer toward the upper wall portion 15 of the stack case 10, bent again near the upper wall portion 15 so as to extend in the −Z direction in parallel with the upper wall portion 15, and bent so as to extend in the +Y direction, that is, away from the upper wall portion 15 of the stack case 10, to be continuous with the other end thereof. In this manner, the partition wall portion 76 has a partition wall projecting portion 761 that projects toward the stack case 10. As illustrated in FIG. 3, the partition wall projecting portion 761 extends in parallel with the upper wall portion 15, and projects from the adapter 70 toward the opening portion 15*a* so as to be surrounded by the flange portion 18 of the stack case 10. The partition wall projecting portion 761 is parallel to the upper wall portion 15. However, the present disclosure is not limited thereto. For example, the partition wall projecting portion 761 may be gently curved so as to be convex in the −Y direction without contacting the upper wall portion 15, or may be inclined obliquely.

The partition wall portion 76 is positioned between the opening portion 15*a* of the stack case 10 and the opening portion 56 of the converter case 50. This means that the partition wall portion 76 intersects at least one of a plurality of imaginary lines that pass through the opening portions 15*a* and 56 between the opening portion 15*a* and the opening portion 56. In other words, it means that the partition wall portion 76 is positioned on any of the imaginary lines described above between the opening portion 15*a* and the opening portion 56. Heat conduction to be discussed later is suppressed when such a positional relationship is met. As illustrated in FIG. 3, the opening portions 15*a* and 56 face each other in the Y direction via the partition wall portion 76, and therefore one of the "plurality of imaginary lines" described above is parallel to the Y direction. However, the present disclosure is not limited thereto. Imaginary lines inclined with respect to the Y direction may also be included if such lines can connect between the opening portions 15*a* and 56. In addition, the partition wall portion 76 does not intersect all the "plurality of imaginary lines" described above. This means that the partition wall portion 76 is not interposed between a part of the opening portion 15*a* and a part of the opening portion 56, through which the connection bus bars 112 and 113 pass.

The plurality of unit cells 106 generate heat along with power generation. This heat may be conducted to the capacitor 501 etc. of the step-up converter 500 via the opening portion 15*a,* the internal space S, and the opening portion 56, which may affect the performance of such electronic parts. In addition, the capacitor 501, the reactor 504, etc. generate heat when the step-up converter 500 converts the output power of the fuel cell stack 100. Such heat may be conducted to the fuel cell stack 100 via the opening portion 56, the internal space S, and the opening portion 15*a,* which may dry the electrolyte membranes of the unit cells 106 and affect power generation performance, for example. In the present embodiment, heat conduction between the fuel cell stack 100 and the step-up converter 500 is suppressed by the partition wall portion 76 being positioned between the opening portion 15*a* and the opening portion 56. A case where the partition wall portion 76 is not provided and the opening portion 15*a* and the opening portion 56 face each other is considered. Air heated to a high temperature by heat generated by the step-up converter 500 and air heated to a high temperature by heat generated by the fuel cell stack 100 can freely move inside an integral case defined by the stack case 10, the converter case 50, and the adapter 70, which facilitates heat conduction. In the present embodiment, on the other hand, the partition wall portion 76 suppresses free movement of air, which suppresses heat conduction.

In addition, as illustrated in FIGS. 2 and 3, the partition wall portion 76 faces a part of the IPM 502, the current sensor 503, and a part of the reactor 504 via the internal space S. Consequently, conduction of heat from such electronic parts to the fuel cell stack 100 can be suppressed efficiently, and conduction of heat from the fuel cell stack 100 to such electronic parts can also be suppressed. Further, the partition wall portion 76 faces a part of the fuel cell stack 100 via the opening portion 15*a*. Consequently, conduction of heat of the fuel cell stack 100 to the step-up converter 500 can be suppressed efficiently.

A metal material with a low thermal conductivity may be adopted as the material of the entire adapter 70 in consideration of suppression of heat conduction by the partition wall portion 76. In addition, the material of the partition wall portion 76 and the material of other portions of the adapter 70 may be different from each other such that the thermal conductivity of the partition wall portion 76 is lower than the thermal conductivity of the other portions of the adapter 70, for example. In this case, the material of the partition wall portion 76 may be determined with a higher priority given to the lower thermal conductivity, rather than the higher rigidity, and the material of the other portions of the adapter 70 may be determined with a higher priority given to the higher rigidity, for example. For example, the flange portions 78 and 79 and the surrounding wall portion 71 of the adapter 70 may be constituted from an aluminum alloy, and the partition wall portion 76 may be constituted from a synthetic resin. In addition, the partition wall portion 76 is preferably sized so as to block as large an area between the opening portion 15*a* and the opening portion 56 as possible. However, the partition wall portion 76 may be sized so as to face only a part with the lowest heat resistance or a part that reaches the highest temperature, among the plurality of electronic parts which constitute the step-up converter 500 discussed above, for example.

It is conceivable to increase the adapter 70 in size in the Y direction so as to increase the distance between the stack case 10 and the converter case 50 in order to suppress heat conduction. In this case, however, the entire fuel cell unit 1 is increased in size in the Y direction. In the present embodiment, heat conduction between the fuel cell stack 100 and the step-up converter 500 is suppressed, while reducing the entire fuel cell unit 1 in size in the Y direction, by providing the partition wall portion 76. Specifically, the adapter 70 is smaller in size in the direction in which the stack case 10 and the converter case 50 are arranged side by side via the adapter 70, specifically in the Y direction, than each of the stack case 10 and the converter case 50. Therefore, the entire fuel cell unit 1 is reduced in size in the Y direction. The converter case 50 is smaller in size in the Y direction than the stack case 10, and this also reduces the entire fuel cell unit 1 in size in the Y direction.

In the present embodiment, as illustrated in FIGS. 2 and 3, the opening portion 15*a* is formed to extend in the X direction generally over the entire upper wall portion 15. For example, it is conceivable to individually provide the upper wall portion 15 with an opening portion with a minimum size to expose only the projecting portion of the terminal plate 102 to be connected to the connection bus bar 112 and an opening portion with a minimum size to expose only the projecting portion of the terminal plate 101 to be connected to the connection bus bar 113, in order to suppress heat conduction. In this case, however, the workability in inserting the fuel cell stack 100 into the stack case 10 may be degraded in the process of manufacturing the fuel cell unit 1. Specifically, the fuel cell stack 100 which includes the terminal plates 101 and 102 which have been assembled in advance is inserted into the stack case 10 in the +X direction. In the case where the upper wall portion 15 is provided with only two opening portions with a minimum size as described above, however, the projecting portion of the terminal plate 101 and the upper wall portion 15 may interfere with each other during insertion, which may degrade workability. In addition, the stack case 10 is shaped by casting or die casting, and providing the upper wall portion 15 with two opening portions complicates the structure of a die, which may increase the manufacturing cost of the stack case 10. Therefore, in the present embodiment, the opening portion 15a extends along the X direction, which improves the workability during insertion discussed above and reduces the manufacturing cost.

As illustrated in FIG. 2, the area of the opening portion 15a is smaller than the area of an opening defined by the inner peripheral edge of the flange portion 78. Therefore, heat conduction between the fuel cell stack 100 and the step-up converter 500 is suppressed.

The partition wall portion 76 can also suppress entry of waste, to be described below, into the stack case 10, in addition to suppressing heat conduction. For example, when a bolt for fastening the flange portion 79 and the flange portion 59 to each other is adjusted after completion of the fuel cell unit 1, the surface of the bolt or the bolt hole may be worn to produce metal abrasive powder in the adapter 70 etc. The thus produced metal abrasive powder may intrude into the stack case 10 via the opening portion 15a. In the present embodiment, the partition wall portion 76 can suppress intrusion of such waste into the stack case 10. Further, the partition wall portion 76 is provided at a position closer to the opening portion 15a than to the opening portion 56, and the partition wall projecting portion 761 projects from the adapter 70 so as to be closer toward the opening portion 15a. Therefore, intrusion of waste into the stack case 10 can be suppressed further effectively.

Others

The partition wall portion 76 is connected to the inner peripheral edge of the flange portion 78. However, the present disclosure is not limited thereto. The partition wall portion 76 may be connected to the inner peripheral side surface of the surrounding peripheral portion 711 of the surrounding wall portion 71, or the inner peripheral edge of the flange portion 79. For example, both ends of the partition wall portion 76 may be connected to two sides of the surrounding peripheral portion 711 of the surrounding wall portion 71 that face each other, or may be connected to two sides of the inner peripheral edge of the flange portion 79 that face each other. Alternatively, one end of the partition wall portion 76 may be connected to any of the inner peripheral edge of the flange portion 78, the inner peripheral side surface of the surrounding peripheral portion 711, and the inner peripheral edge of the flange portion 79, and the other end of the partition wall portion 76 may be connected to any of the inner peripheral edge of the flange portion 78, the inner peripheral side surface of the surrounding peripheral portion 711, and the inner peripheral edge of the flange portion 79. In addition, the partition wall portion 76 is provided at a position closer to the opening portion 15a than to the flange portion 59. However, the present disclosure is not limited thereto. In addition, the partition wall portion 76 has the partition wall projecting portion 761 which projects from the side of the adapter 70 toward the stack case 10. However, the partition wall portion 76 may not have such a partition wall projecting portion 761. Thus, the partition wall portion 76 may not project from the adapter 70.

The opening portion 56 has the same size as an opening defined by the inner peripheral edge of the flange portion 59. However, the present disclosure is not limited thereto. For example, a wall portion that is parallel to the XZ plane may be provided inside the flange portion 59, and the wall portion may be provided with an opening portion that allows passage of the connection bus bars 112 and 113, the opening portion being surrounded by the flange portion 59. A single opening portion, which allows passage of both the connection bus bars 112 and 113 and the longitudinal direction of which corresponds to the X direction, may be provided, or opening portions that respectively allow passage of the connection bus bars 112 and 113 may be provided individually. Also in such cases, it is necessary to provide the partition wall portion 76 between the opening portion of the converter case 50 and the opening portion 15a of the stack case 10, in order to suppress heat conduction.

In the present embodiment, the fuel cell unit 1 includes the auxiliary machine unit 200 which is fixed to the end plate 12a. However, the fuel cell unit 1 may not include the auxiliary machine unit 200. In this case, supply pipes and discharge pipes that allow an oxidant gas, a fuel gas, and cooling water to be supplied and discharged are connected to the end plate 12a. Therefore, end portions of such pipes connected to the end plate 12a intersect the surrounding bottom portion 713 of the surrounding wall portion 71 of the adapter 70 and a part of the converter case 50 in the Y direction. Therefore, the entire fuel cell unit including the end portions of such pipes is reduced in size in the direction of the XZ plane.

In the present embodiment, the upper wall portion 15 of the stack case 10 is provided with the opening portion 15a. However, the upper wall portion 15 itself may not be provided. In this case, the opening portion of the stack case 10 is an opening defined inside the flange portion 18. In addition, at least two auxiliary machines are integrated with the auxiliary machine unit 200. However, one auxiliary machine may be fixed to the end plate 12a in place of the auxiliary machine unit 200.

The adapter 70 is in a generally flat shape in which the size of the adapter 70 in the Y direction is small compared to the respective sizes thereof in the X direction and the Z direction. However, the present disclosure is not limited thereto. For example, the adapter may be a tubular body in a truncated pyramid shape with the inside diameter becoming gradually larger in the +Y direction. It should be noted, however, that even in this case, the size of the adapter in the Y direction is preferably smaller than the respective sizes of the stack case 10 and the converter case 50 in the Y direction, in order to reduce the entire fuel cell unit in size in the Y direction.

The flange portion 18 of the stack case 10 and the flange portion 59 of the converter case 50 may be different in at least one of shape and size from each other. This is because the two flange portions cannot be directly fixed to each other, not via an adapter, if the respective sizes of the flange portions are different even if the respective shapes thereof are the same. The same also applies to a case where the respective shapes of the flange portions are different even if the respective sizes thereof are the same.

The fuel cell unit 1 may be mounted onto a vehicle etc. with the side of the bottom wall portion 16 of the stack case 10 disposed on the lower side in the direction of gravitational force. However, the fuel cell unit 1 may be mounted on a vehicle etc. in a different orientation. For example, the fuel cell unit 1 may be mounted onto a vehicle etc. with the side of the end plate 12a of the stack case 10 disposed on the lower side in the direction of gravitational force. In this case, the performance of discharging liquid water from the fuel cell stack 100 is improved, occurrence of flooding during power generation and freezing of remaining water in the fuel cell stack 100 after stoppage of power generation can be prevented, and a reduction in the power generation performance of the fuel cell stack 100 can be suppressed. Alternatively, the fuel cell unit 1 may be mounted onto a vehicle etc. with the side of the upper wall portion 55 of the converter case 50 disposed on the lower side in the direction of gravitational force. In addition, the converter case 50 may be fixed obliquely with respect to the stack case 10.

First Modification

Figure 4:
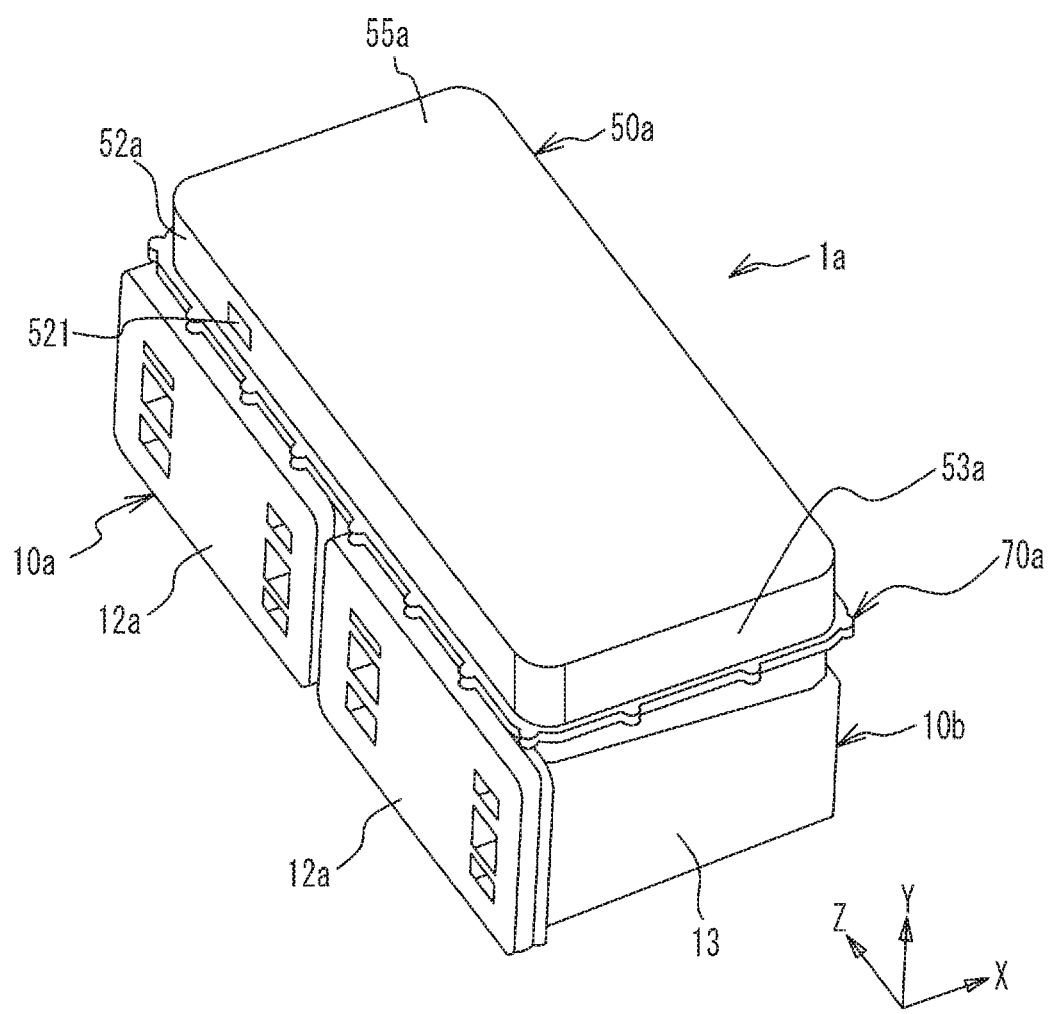
FIG. 4 is a perspective view illustrating the appearance of a fuel cell unit according to a first modification.
Figure 5:
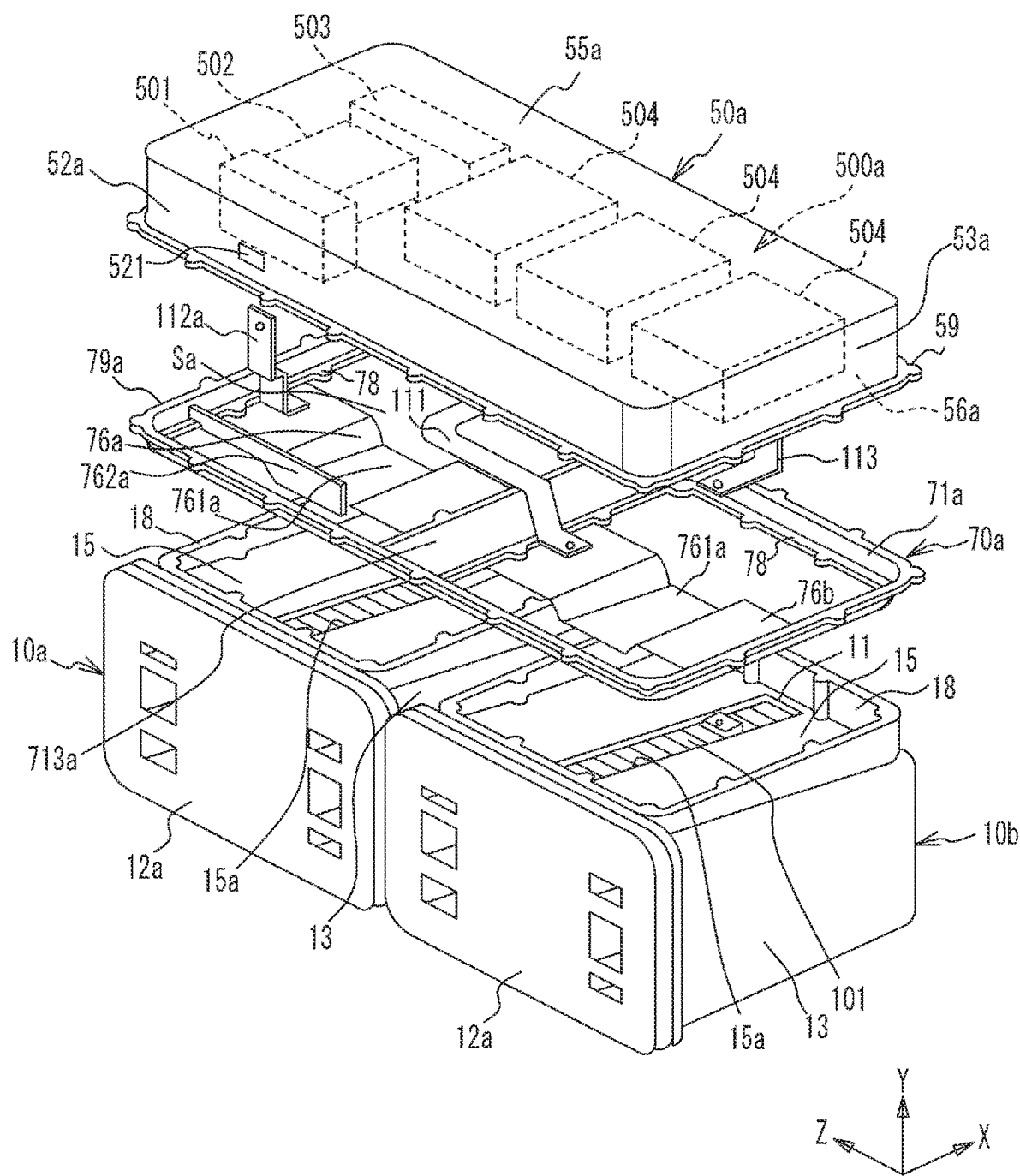
FIG. 5 is an exploded perspective view of the fuel cell unit according to the first modification.
Figure 6:
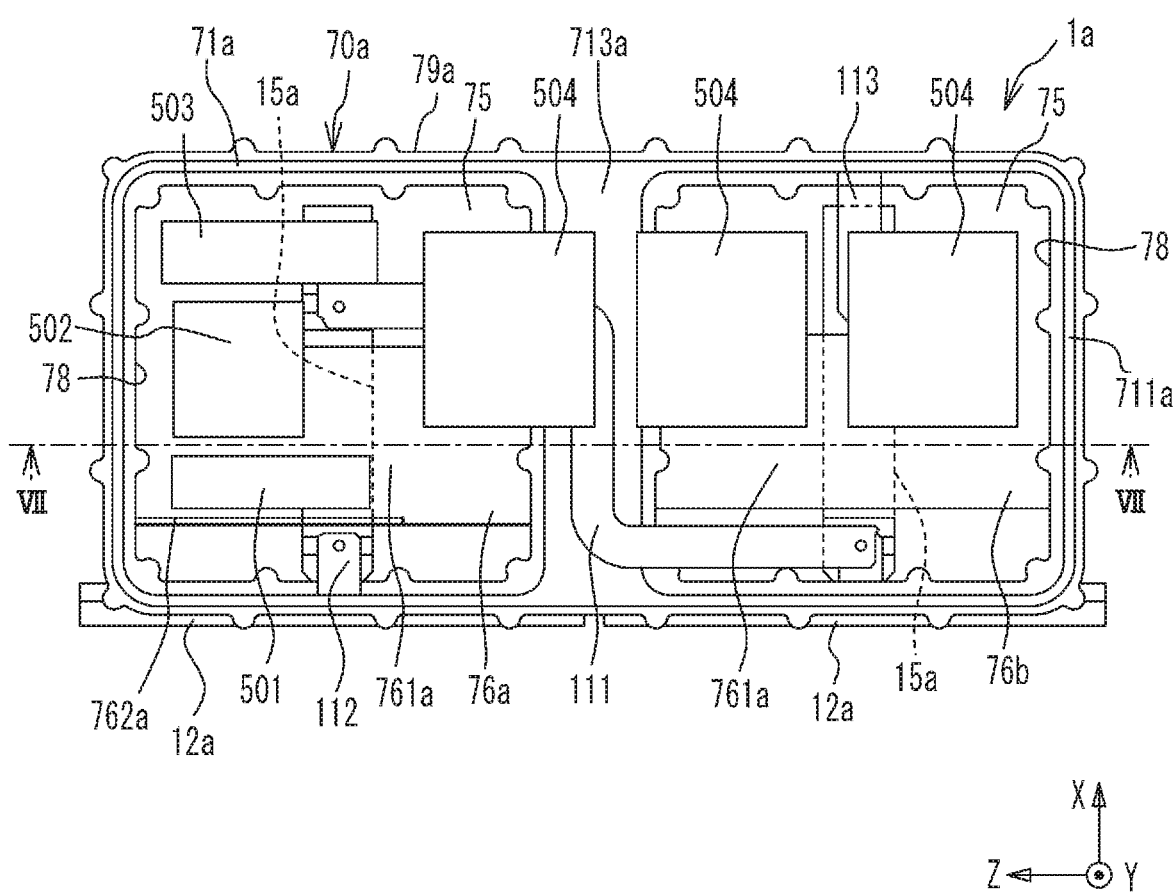
FIG. 6 illustrates the inside of the fuel cell unit according to the first modification as seen from the upper side.
Figure 7:
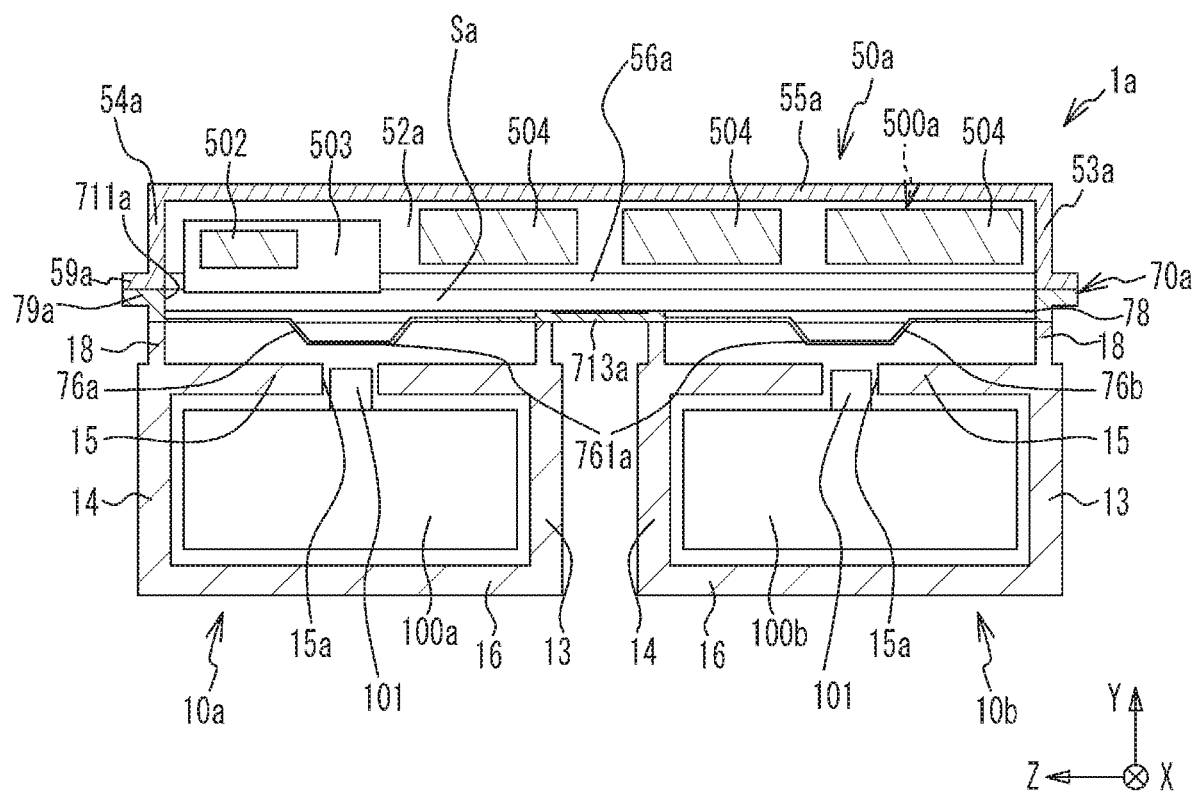
FIG. 7 is a sectional view taken along the line VII-VII in FIG. 6.

Next, a fuel cell unit 1a according to a first modification will be described. Components that are the same as or similar to those according to the present embodiment are given the same or similar reference numerals to omit description thereof. FIG. 4 is a perspective view illustrating the appearance of a fuel cell unit 1a according to a first modification. FIG. 5 is an exploded perspective view of the fuel cell unit 1a according to the first modification. FIG. 6 illustrates the inside of the fuel cell unit 1a according to the first modification as seen from the upper side. FIG. 7 is a sectional view taken along the line VII-VII in FIG. 6.

Schematic Configuration of Fuel Cell Unit 1a

The fuel cell unit 1a includes stack cases 10a and 10b, fuel cell stacks 100a and 100b housed in the stack cases 10a and 10b, respectively, a converter case 50a, a step-up converter 500a housed in the converter case 50a, and an adapter 70a. The stack cases 10a and 10b are the same as the stack case 10 according to the present embodiment discussed above, and the fuel cell stacks 100a and 100b are the same as the fuel cell stack 100 discussed above. For convenience of description, different reference numerals are given. The stack cases 10a and 10b are adjacent to each other with the side wall portion 13 of the stack case 10a and the side wall portion 14 of the stack case 10b facing each other in the Z direction, and the end plates 12a which are respectively fixed to the stack cases 10a and 10b are oriented in the same −X direction. The adapter 70a is interposed between the two stack cases 10a and 10b and the converter case 50a. The size of each of the converter case 50a and the adapter 70a in the Z direction corresponds to the total size of the two stack cases 10a and 10b in the Z direction. In addition, the size of each of the converter case 50a and the adapter 70a in the X direction corresponds to the size of each of the stack cases 10a and 10b in the X direction. As illustrated in FIG. 4, the entire fuel cell unit 1a also has a generally rectangular parallelepiped shape, and the mountability of the fuel cell unit 1a onto a vehicle etc. is improved.

As illustrated in FIGS. 5 and 6, the fuel cell stacks 100a and 100b and the step-up converter 500a are electrically connected to each other through connection bus bars 112a and 113 and a relay bus bar 111. Specifically, one end of the relay bus bar 111 is connected to the projecting portion of the terminal plate 101 of the fuel cell stack 100a, the relay bus bar 111 extends from the side of the stack case 10a to the side of the stack case 10b, and the other end of the relay bus bar 111 is connected to the projecting portion of the terminal plate 102 of the fuel cell stack 100b. In this manner, the two fuel cell stacks 100a and 100b are electrically connected in series with each other through the relay bus bar 111. The connection bus bar 112a electrically connects between the terminal plate 102 of the fuel cell stack 100a and the step-up converter 500a, and the connection bus bar 113 electrically connects between the terminal plate 101 of the fuel cell stack 100b and the step-up converter 500a. The connection bus bar 112a is different in shape from the connection bus bar 112 discussed above, and a portion of the connection bus bar 112a that extends in the X direction is formed to be short. In FIG. 7, the connection bus bar 113 and the relay bus bar 111 are not illustrated. The connection bus bars 112a and 113 and the relay bus bar 111 are examples of a conductive member. The connection bus bars 112a and 113 are examples of a connection conductive member. The relay bus bar 111 is an example of a relay conductive member.

As illustrated in FIG. 5, the respective end plates 12a of the stack cases 10a and 10b are disposed on the same side, and therefore supply pipes and discharge pipes to be connected to the end plates 12a can be concentrated on the same side with respect to the fuel cell unit 1a. Therefore, the mountability of the fuel cell unit 1a is improved. In addition, as illustrated in FIG. 7, the side wall portion 13 of the stack case 10a and the side wall portion 14 of the stack case 10b face each other with a predetermined clearance therebetween. Therefore, the heat radiation performance of the stack cases 10a and 10b is secured compared to a case where the stack cases 10a and 10b directly contact each other. In addition, the stack cases 10a and 10b are identical members, and the fuel cell stacks 100a and 100b are also identical stacks. Therefore, the manufacturing cost is reduced compared to a case where different members are used.

Schematic Configuration of Converter Case 50a

Side wall portions 51a and 52a of the converter case 50a are respectively longer in the Z direction than the side wall portions 51 and 52 of the converter case 50 discussed above. Side wall portions 53a and 54a of the converter case 50a are respectively shorter in the X direction than the side wall portions 53 and 54 of the converter case 50 discussed above. An upper wall portion 55a is larger in area than the upper wall portion 55 of the converter case 50 discussed above.

Schematic Configuration of Step-up Converter 500a

The step-up converter 500a includes a capacitor 501, an IPM 502, a current sensor 503, and three reactors 504. The capacitor 501, the IPM 502, and the current sensor 503 are provided in the vicinity of the side wall portion 54a. The three reactors 504 are provided so as to be arranged side by side in the Z direction. The capacitor 501, the IPM 502, the current sensor 503, and the three reactors 504 are electrically connected to each other through a conductive member (not illustrated). As illustrated in FIG. 7, the lower end portion of the current sensor 503 slightly projects from the converter case 50a into the adapter 70a, and so does the lower end portion of the capacitor 501. However, the present disclosure is not limited thereto.

Detailed Configuration of Adapter 70a

The adapter 70a is provided with two flange portions 78 that are adjacent to each other in the Z direction. The two flange portions 78 correspond in shape and size to the respective flange portions 18 of the stack cases 10a and 10b to be fixed thereto. The flange portion 79a of the adapter 70a corresponds in shape and size to the flange portion 59a of the converter case 50a to be fixed thereto. As illustrated in FIG. 6, the two flange portions 78 are formed so as to be positioned inside the flange portion 79a in the direction of the XZ plane. A surrounding peripheral portion 711a of a surrounding wall portion 71a of the adapter 70a extends around the entire flange portion 79a. A surrounding bottom portion 713a of the surrounding wall portion 71a is positioned between the two adjacent flange portions 78, and parallel to the XZ plane. In other words, the surrounding bottom portion 713a extends in the −Z direction from the flange portion 78 which is fixed to the stack case 10a, and extends in the +Z direction from the flange portion 78 which is fixed to the stack case 10b. The relay bus bar 111 discussed above extends from the side of the stack case 10a to the side of the stack case 10b across the surrounding bottom portion 713a. An internal space Sa is continuous with two openings defined by the two flange portions 78 and an opening defined by the flange portion 79a.

Detailed Configuration of Partition Wall Portions 76a and 76b

A partition wall portion 76a is positioned between the opening portion 15a of the stack case 10a and an opening portion 56a of the step-up converter 500a. The partition wall portion 76a is provided with a partition wall side portion 762. The partition wall side portion 762 is also continuous with a partition wall projecting portion 761a, and extends in the +Y direction. A partition wall portion 76b is positioned between the opening portion 15a of the stack case 10b and the opening portion 56a of the step-up converter 500a. Unlike the partition wall portion 76a, however, the partition wall portion 76b is not provided with the partition wall side portion 762. The partition wall portion 76a suppresses heat conduction between the fuel cell stack 100a and the step-up converter 500a, and the partition wall portion 76b suppresses heat conduction between the fuel cell stack 100b and the step-up converter 500a.

Figure 8:
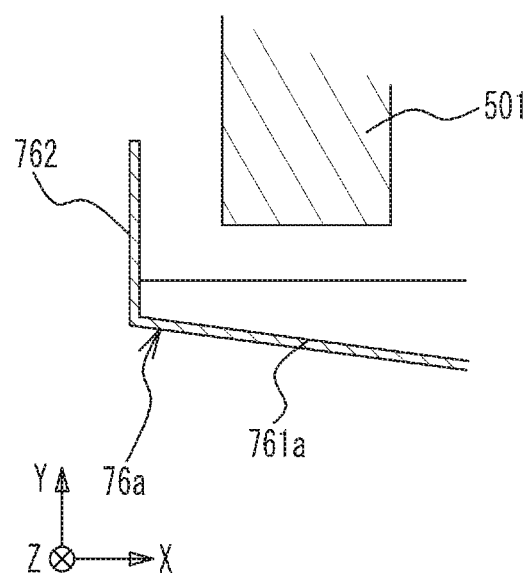
FIG. 8 is a partial sectional view of a partition wall portion and a capacitor.

FIG. 8 is a partial sectional view of the partition wall portion 76a and the capacitor 501. FIG. 8 illustrates a sectional surface that is parallel to the XY plane. A part of the partition wall projecting portion 761a and the capacitor 501 face each other in the Y direction, and a part of the partition wall side portion 762 and a part of the capacitor 501 face each other in the X direction. The X direction is an example of a direction that is orthogonal to the direction in which the stack case 10 and the converter case 50 are arranged side by side via the adapter 70a. In this manner, the partition wall portion 76a is shaped to cover a part of the capacitor 501. Heat conduction from the fuel cell stack 100a to the capacitor 501 is suppressed by surrounding the capacitor 501, which has a low allowable temperature compared to the other parts, in this manner The partition wall side portion 762 extends in parallel with the YZ plane. However, the present disclosure is not limited thereto. The partition wall side portion 762 may be inclined with respect to the YZ plane, be curved, or be curved together with the partition wall projecting portion 761a, as long as the partition wall side portion 762 faces at least a part of the capacitor 501 in the X direction.

Others

In the first modification, the partition wall side portion 762 faces the capacitor 501 in the X direction. However, the present disclosure is not limited thereto. The partition wall side portion 762 may face any of the IPM 502, the current sensor 503, and the three reactors 504. In addition, the partition wall side portion 762 may extend into the opening portion 56a.

In the first modification, the two fuel cell stacks 100a and 100b are electrically connected in series with each other through the relay bus bar 111. However, the present disclosure is not limited thereto. For example, the two fuel cell stacks 100a and 100b may be electrically connected in parallel with the step-up converter 500, which is a power converter, through connection bus bars.

In the first modification, the two stack cases 10a and 10b and the converter case 50a are fixed to each other via the adapter 70a. However, the present disclosure is not limited thereto. For example, three or more stack cases and one converter case may be fixed to each other via an adapter. In this case, it is necessary to provide the adapter with flange portions that correspond in shape and size to the respective flange portions of the stack cases. In addition, the three or more fuel cell stacks may be connected in series with a step-up converter through a plurality of relay bus bars, or may be connected in parallel therewith through connection bus bars.

The fuel cell unit 1a according to the first modification may be mounted onto a vehicle etc. with the side of the bottom wall portion 16 of each of the stack cases 10a and 10b disposed on the lower side in the direction of gravitational force. However, the fuel cell unit 1a may be mounted on a vehicle etc. in a different orientation.

The stack cases 10a and 10b are identical members. However, the present disclosure is not limited thereto. For example, in the case where the stack cases 10a and 10b are shaped differently and the respective flange portions 18 thereof are also shaped differently, the two flange portions 78 of the adapter 70a may also be shaped differently so as to correspond thereto. In addition, the fuel cell stacks 100a and 100b are also identical members. However, the present disclosure is not limited thereto. For example, the total number of unit cells 106 stacked may be different, or the size of the unit cells 106 etc. in the planar direction itself may be different.

In the first modification, the converter case 50 is fixed via the adapter 70a with the end plates 12a, which are respectively fixed to the stack cases 10a and 10b, facing the −X direction. However, the present disclosure is not limited thereto. For example, the converter case 50a may be fixed via the adapter 70a with one of the end plates 12a, which are respectively fixed to the stack cases 10a and 10b, facing the −X direction and with the other end plate 12a facing the +X direction. Alternatively, the converter case 50a may be fixed via the adapter 70a with the end plate 12a on the stack case 10a side facing the +Z direction and with the end plate 12a on the stack case 10b side facing the −Z direction. In such a case, it is necessary to newly prepare the adapter 70a, the relay bus bar 111, and the connection bus bars 112 and 113 corresponding to the posture of the stack cases 10a and 10b, which is less expensive than to newly prepare the stack cases 10a and 10b which match the respective postures of the adapter 70a etc. without changing the adapter 70a etc. Consequently, it is possible to manufacture, at a low cost, the fuel cell unit 1 in which the postures of the stack cases 10a and 10b are optimum for a mount space which differs among vehicle types, for example.

Second Modification

Figure 9:
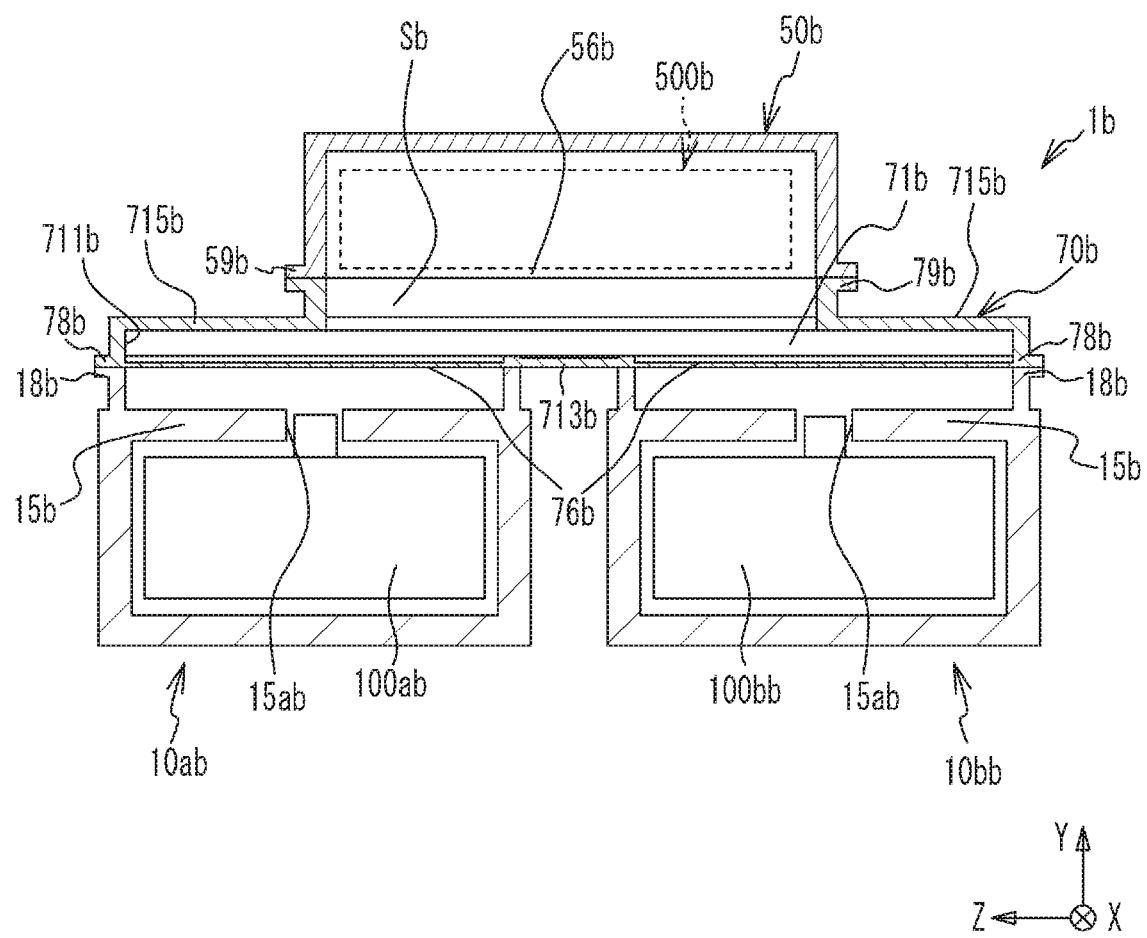
FIG. 9 is a sectional view of a fuel cell unit according to a second modification.
Figure 10:
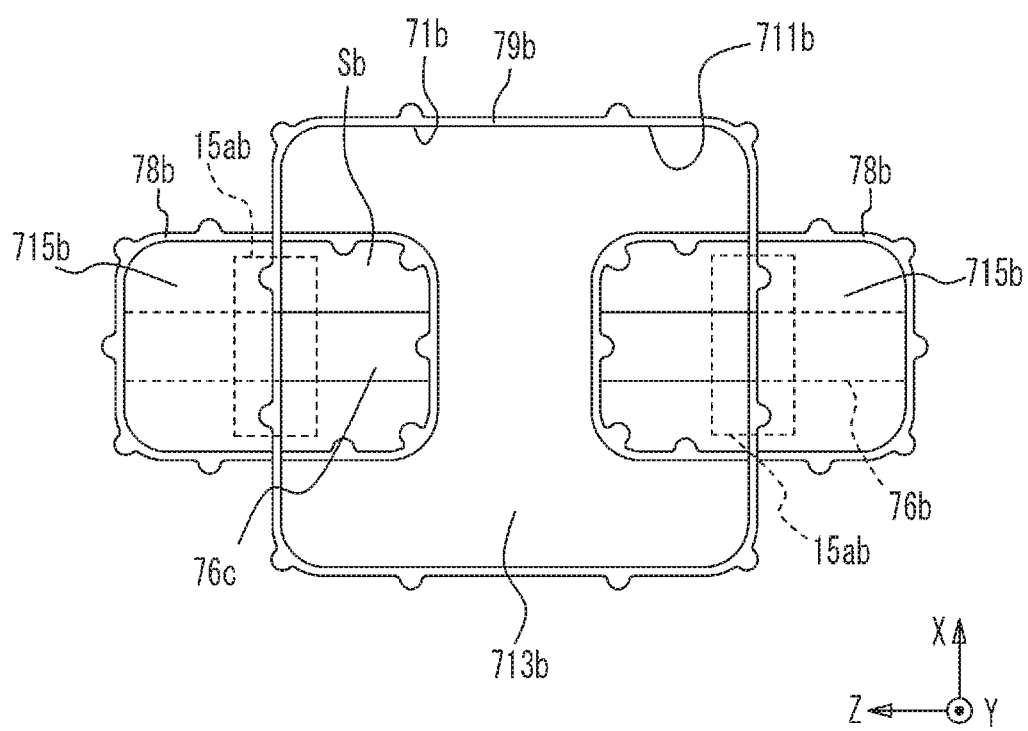
FIG. 10 illustrates an adapter as seen from above.

Next, a fuel cell unit 1b according to a second modification will be described. FIG. 9 is a sectional view of the fuel cell unit 1b according to the second modification. FIG. 9 corresponds to FIG. 7. In FIG. 9, a step-up converter 500b is illustrated in a simplified manner by the dashed lines, and stack cases 10ab and 10bb are not given some reference numerals to omit description. The stack cases 10ab and 10bb are respectively different in shape from the stack cases 10*a* and 10*b* discussed above, and the flange portions thereof are also different in shape from the flange portions 18 discussed above. Such differences will be discussed in detail later. The stacking direction of unit cells of fuel cell stacks 100*ab* and 100*bb* housed in the stack cases 10*ab* and 10*bb*, respectively, is the X direction as in the present embodiment and the first modification. FIG. 10 illustrates an adapter 70*b* as seen from above. In FIG. 10, opening portions 15*ab* of respective upper wall portions 15*b* of the stack cases 10*ab* and 10*bb* are indicated by the dashed lines.

Detailed Configuration of Adapter 70*b*

The adapter 70*b* includes two flange portions 78*b* and one flange portion 79*b*. As illustrated in FIG. 10, the two flange portions 78*b* are arranged side by side in the Z direction, and each partially extend to the outside of the flange portion 79*b*. A surrounding wall portion 71*b* includes a surrounding peripheral portion 711*b*, two surrounding upper portions 715*b*, and a surrounding bottom portion 713*b*. The surrounding peripheral portion 711*b* includes a peripheral wall in regions in which the two flange portions 78*b* project from the flange portions 79*b*, and a peripheral wall surrounded by the flange portion 79*b*. The surrounding bottom portion 713*b* extends in parallel with the XZ plane inside the flange portion 79*b* and outside the two flange portions 78*b*. The surrounding upper portions 715*b* extend in parallel with the XZ plane outside the flange portion 79*b* and inside the two flange portions 78*b*.

An internal space Sb communicates with an opening surrounded by the flange portion 79*b* and openings surrounded by the two flange portions 78*b*. Since the two flange portions 78*b* each partially project in the direction of the XZ plane with respect to the flange portion 79*b* as discussed above, the internal space Sb is shaped such that two passages communicate with one passage.

As illustrated in FIG. 10, the flange portions 78*b* are inward flanges at portions inside the flange portion 79*b*, but are outward flanges at portions outside the flange portion 79*b*. The respective flange portions of the stack cases 10*ab* and 10*bb* correspond to the shapes of the flange portions 78*b*, and are partially inward flanges and partially outward flanges. Consequently, the inward flanges of the flange portions 78*b* can be fixed to the inward flanges of the respective flange portions of the stack cases 10*ab* and 10*bb* via the internal space Sb, and the outward flanges of the flange portions 78*b* can be fixed to the outward flanges of the respective flange portions of the stack cases 10*ab* and 10*bb* from the outside of the adapter 70*b*.

Detailed Configuration of Partition Wall Portion 76*c*

A partition wall portion 76*c* extends so as to connect between two sides of the flange portion 78*b* that extend in parallel with the X direction. The partition wall portion 76*c* is not provided with the partition wall projecting portion 761 etc. discussed above, and is parallel to the XZ plane. However, the present disclosure is not limited thereto. The partition wall portion 76*c* may be provided with the partition wall projecting portion 761. The partition wall portion 76*c* is also positioned between the opening portion 15*ab* and an opening portion 56*b* of the converter case 50*b*, which suppresses heat conduction. In addition, the partition wall portion 76*c* may include a partition wall side portion such as the partition wall side portion 762 discussed above. The partition wall side portion is preferably provided inside the flange portion 78*b* and inside the flange portion 79 as seen from above the adapter 70*b*, so as to face at least a part of at least one of a plurality of electronic parts of the step-up converter 500*b* in the X direction.

The relay bus bars and the connection bus bars connect the two fuel cell stacks 100*ab* and 100*bb* in series with each other, and electrically connect the fuel cell stacks 100*ab* and 100*bb* to the step-up converter 500*b*. However, the present disclosure is not limited thereto. The relay bus bars and the connection bus bars may connect the fuel cell stacks 100*ab* and 100*bb* in parallel with each other, and electrically connect the fuel cell stacks 100*ab* and 100*bb* to the step-up converter 500. In this event, the relay bus bars and the connection bus bars are preferably provided so as not to interfere with the surrounding bottom portion 713*b*, the surrounding upper portion 715*b*, and the partition wall portion 76*c*.

Others

The fuel cell unit 1*b* according to the second modification may be mounted onto a vehicle etc. with the side of the respective bottom wall portions of the stack cases 10*ab* and 10*bb* disposed on the lower side in the direction of gravitational force. However, the fuel cell unit 1*b* may be mounted on a vehicle etc. in a different orientation.

While an embodiment of the present disclosure has been discussed in detail above, the present disclosure is not limited to such a specific embodiment, and may be subjected to a variety of modifications and alterations.

What is claimed is:

1. A fuel cell unit comprising:
   at least one fuel cell stack;
   at least one first case that houses the at least one fuel cell stack;
   a power converter that converts power of the fuel cell stack;
   a second case that houses the power converter;
   an adapter that fixes the first and second cases to each other; and
   a conductive member that electrically connects between the fuel cell stack and the power converter, wherein:
   the first case includes a first opening portion and a first flange portion that surrounds the first opening portion;
   the second case includes a second opening portion and a second flange portion that surrounds the second opening portion and that is different in at least one of shape and size from the first flange portion;
   the conductive member includes a connection conductive member that is connected to the fuel cell stack, that extends from the first opening portion to the second opening portion via an internal space of the adapter, and that is connected to the power converter; and
   the adapter includes
      a third flange portion fixed in correspondence with a shape and a size of the first flange portion,
      a fourth flange portion fixed in correspondence with a shape and a size of the second flange portion,
      a surrounding wall portion that is continuous from the third flange portion to the fourth flange portion so as to define the internal space which communicates with an opening defined inside the third flange portion and an opening defined inside the fourth flange portion, and
      a partition wall portion which is connected to an inner side surface of the adapter, is apart from the connection conductive member, and is positioned between the first opening portion and the second opening portion.

2. The fuel cell unit according to claim 1, wherein the partition wall portion is closer to the first opening portion than to the second opening portion.

3. The fuel cell unit according to claim 1, wherein the partition wall portion includes a partition wall projecting portion that projects from an adapter side toward a first opening portion side so as to be surrounded by the first flange portion.

4. The fuel cell unit according to claim 1, wherein:
the power converter includes a plurality of electronic parts; and
the partition wall portion faces at least a part of at least one of the electronic parts via the internal space.

5. The fuel cell unit according to claim 4, wherein the partition wall portion includes a partition wall side portion that faces at least the part of the at least one of the electronic parts in a direction that is orthogonal to a direction in which the first and second cases are arranged side by side via the adapter.

6. The fuel cell unit according to claim 1, wherein:
the first case has a facing wall portion that is provided with the first opening portion and that faces the partition wall portion; and
the first opening portion is smaller in area than the opening defined inside the third flange portion.

7. The fuel cell unit according to claim 1, wherein the adapter is smaller in size, in a direction in which the first and second cases are arranged side by side via the adapter, than each of the first and second cases.

8. The fuel cell unit according to claim 1, wherein:
at least a part of the fourth flange portion projects, in an intersecting direction which intersects a direction in which the first and second cases are arranged side by side via the adapter, with respect to the third flange portion; and
the surrounding wall portion has a surrounding extended portion that extends in the intersecting direction from the third flange portion.

9. The fuel cell unit according to claim 8, wherein:
the fuel cell stack has an end plate fixed to the first case and provided with a supply hole that allows a reaction gas to be supplied from the fuel cell stack and a discharge hole that allows the reaction gas to be discharged to the fuel cell stack; and
the surrounding extended portion faces the end plate in the direction in which the first and second cases are arranged side by side via the adapter.

10. The fuel cell unit according to claim 9, wherein:
an auxiliary machine that supplies the reaction gas to the fuel cell stack is fixed to the end plate; and
the surrounding extended portion faces the auxiliary machine in the direction in which the first and second cases are arranged side by side via the adapter.

11. The fuel cell unit according to claim 1, wherein:
the at least one fuel cell stack includes a plurality of fuel cell stacks;
the at least one first case respectively houses the at least one fuel cell stack; and
the adapter includes the third flange portion which is respectively fixed to the first flange portion of the at least one first case.

12. The fuel cell unit according to claim 8, wherein:
the at least one fuel cell stack includes a plurality of fuel cell stacks;
the at least one first case respectively houses the at least one fuel cell stack;
the adapter includes the third flange portion which is respectively fixed to the first flange portion of the at least one first case; and
the surrounding extended portion is positioned between two adjacent third flange portions.

13. The fuel cell unit according to claim 12, wherein:
the conductive member includes a conductive member bus bar that connects two adjacent fuel cell stacks in series with each other; and
the conductive member bus bar extends from one of respective first opening portions of two adjacent first cases to another of the respective first opening portions of the two adjacent first cases across the surrounding extended portion.

* * * * *